United States Patent
Kong et al.

(10) Patent No.: US 9,221,324 B2
(45) Date of Patent: Dec. 29, 2015

(54) EXTERIOR DOOR STRIP ASSEMBLY

(71) Applicant: Hyundai Motor Company, Seoul (KR)

(72) Inventors: Sung-Sik Kong, Whasung-Si (KR);
Chang-Dong Kim, Whasung-Si (KR);
Young-Joon Park, Whasung-Si (KR);
Seung-Hwan Lee, Whasung-Si (KR);
Won-Seok Jun, Whasung-Si (KR);
Joon-Young Hong, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 14/103,135

(22) Filed: Dec. 11, 2013

(65) Prior Publication Data

US 2015/0054301 A1 Feb. 26, 2015

(30) Foreign Application Priority Data

Aug. 20, 2013 (KR) ........................ 10-2013-0098256

(51) Int. Cl.
*B60R 13/04* (2006.01)
*B62D 65/08* (2006.01)
*B60J 1/16* (2006.01)
*B60J 10/00* (2006.01)

(52) U.S. Cl.
CPC ................ *B60J 10/0088* (2013.01); *B60J 1/16* (2013.01); *B60J 10/0062* (2013.01); *B60R 13/04* (2013.01)

(58) Field of Classification Search
CPC ................ B60J 1/16; B60J 1/17; B60J 5/04; B60J 5/0401; B60J 5/0402; B60J 5/0418; B60J 10/0062; B60J 10/0088; B60J 10/0091; B60J 10/04; B60J 10/041; B60R 13/04; B60R 13/06
See application file for complete search history.

(56) References Cited

U.S. PATENT DOCUMENTS

| | | | | | |
|---|---|---|---|---|---|
| 1,757,515 | A | * | 5/1930 | Crowe | ............................ 296/29 |
| 2,635,915 | A | * | 4/1953 | McKinney | .................... 428/122 |
| 3,201,210 | A | * | 8/1965 | Harkins et al. | ................ 428/628 |
| 3,354,584 | A | * | 11/1967 | Parsons | ........................... 49/377 |
| 4,059,301 | A | * | 11/1977 | Meyer | ........................... 293/120 |
| 4,059,938 | A | * | 11/1977 | Aimar | ....................... 52/717.05 |
| 5,353,549 | A | * | 10/1994 | Henderson et al. | .......... 49/490.1 |
| 5,902,085 | A | * | 5/1999 | Yuta | ............................. 411/433 |

(Continued)

FOREIGN PATENT DOCUMENTS

DE 102004055476 B3 * 3/2006
EP 2048379 A1 * 4/2009 ............... B60J 10/00

(Continued)

*Primary Examiner* — Glenn Dayoan
*Assistant Examiner* — Paul Chenevert
(74) *Attorney, Agent, or Firm* — Morgan, Lewis & Bockius LLP

(57) ABSTRACT

A structure of an exterior door strip includes a mounting portion mounted to an outer side of a outer door panel positioned, and a SUS trim coupled to an outer side of the mounting portion, and including: a first mounting portion formed in a longitudinal direction and having an end piece; a bridge connected to an other end of the first mounting portion; and a second mounting portion connected to the other end of the bridge and having a screw hole, in which the first mounting portion, the bridge, and the second mounting portion are integrally formed, and torque caused by screw engagement of the second mounting portion is not transmitted to the first mounting portion, thereby resolving a problem regarding quality in external appearance of the vehicle, preventing corrosion caused by rain water, and reducing production costs of the vehicle.

5 Claims, 4 Drawing Sheets

(56) References Cited

U.S. PATENT DOCUMENTS

| | | | |
|---|---|---|---|
| 6,230,456 B1 * | 5/2001 | Merchlewitz | 52/204.61 |
| 6,244,601 B1 * | 6/2001 | Buchholz et al. | 277/637 |
| 6,409,251 B1 * | 6/2002 | Kaye et al. | 296/146.9 |
| 2010/0186301 A1 * | 7/2010 | Drozd et al. | 49/490.1 |
| 2014/0059939 A1 * | 3/2014 | Bae et al. | 49/475.1 |

FOREIGN PATENT DOCUMENTS

| | | | | |
|---|---|---|---|---|
| JP | 2006-290199 A | 10/2006 | | |
| KR | 1020050097082 A | 10/2005 | | |
| KR | 1020100035749 A | 4/2010 | | |
| WO | WO 2009046179 A1 * | 4/2009 | | B60J 10/04 |

* cited by examiner

EXTERIOR DOOR STRIP ASSEMBLY

CROSS-REFERENCE TO RELATED APPLICATIONS

The present application claims priority of Korean Patent Application Number 10-2013-0098256 filed Aug. 20, 2013, the entire contents of which application is incorporated herein for all purposes by this reference.

BACKGROUND OF INVENTION

1. Field of Invention

The present invention relates to a structure of an exterior door strip, and more particularly, to an exterior door strip assembly that includes a first mounting portion and a second mounting portion, which are connected to each other by a bridge, thereby preventing torque caused by screw engagement from being transmitted to an end piece.

2. Description of Related Art

In general, a passenger door for a vehicle is formed on the side of a vehicle body, and has an outer door panel disposed outward and an inner door panel disposed inward, with structural door frame is attached thereto defining a space in which a door regulator and the like are installed therein.

Particularly, a door glass is installed to be movable upward and downward between the outer door panel and the inner door panel, and an exterior door strip is mounted to an outer side of the outer door panel in order to block exterior dust, rain water, and noise from entering when the door glass is opened and closed, remove foreign substances on the door glass, and make an external appearance design of a vehicle be attractive.

As illustrated in FIGS. 1A and 1B, the prior art exterior door strip includes a mounting portion 2 mounted by a screw to an outer side of the outer door panel 1, and a stainless steel (SUS) trim 3 fitted into and mounted to the mounting portion 2, and end pieces 4 are coupled to both ends of the mounting portion so as to close both ends of the exterior door strip.

However, the exterior door strip of the related art has problems in that torque is generated by screw engagement when the mounting portion 2 is mounted to the outer side of the outer door panel 1, and due to the torque, a gap is enlarged between the SUS trim 3 and the end piece 4.

That is, because the gap between the SUS trim and the end piece, which are exposed to the outside of the vehicle, is enlarged, there are problems in that the entire external appearance of the vehicle becomes unattractive, and corrosion occurs at a portion where a gap is enlarged because of rain water, dust, or the like that flows into the enlarged gap.

In the related art, in order to resolve the aforementioned problem when the gap between the SUS trim and the end piece is enlarged by torque, the mounting portion is configured to be divided into two pieces so that torque caused by a screw is not transmitted to a surface that forms an external appearance.

However, because the mounting portion is configured to be divided into two pieces, there are also problems in that working time and the number of workers required for assembling the vehicle body are increased, and production costs of the vehicle are raised, in comparison with the case in which a single mounting portion is provided.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to provide a structure of an exterior door strip in which a first mounting portion, a bridge, and a second mounting portion, which are integrally formed, are provided such that torque caused by screw engagement of the second mounting portion is not transmitted to the first mounting portion by the bridge, thereby resolving a problem regarding quality in external appearance of the vehicle, and preventing corrosion due to rain water at a portion where a gap is enlarged.

Various aspects of the present invention provide for a structure of an exterior door strip including a mounting portion mounted by a screw to an outer side of a outer door panel positioned at a side of a vehicle, and a stainless steel (SUS) trim coupled to an outer side of the mounting portion, the structure including: a first mounting portion formed in a longitudinal direction and having one end to which an end piece is coupled; a bridge having one end connected to the other end of the first mounting portion; and a second mounting portion connected to the other end of the bridge and having a screw hole formed so that a screw is coupled to the second mounting portion, in which the first mounting portion, the bridge, and the second mounting portion are integrally formed, and torque caused by screw engagement of the second mounting portion is not transmitted to the first mounting portion by the bridge.

In addition, the bridge may be formed as an elastically deformable elastic body so as to absorb torque caused by screw engagement of the second mounting portion.

In addition, the bridge may be formed in a straight line with the screw hole in a longitudinal direction of a vehicle body, and the bridge may have a center portion which is curved toward an upper side or a lower side of a vehicle body.

Moreover, the bridge may be U-shaped wiring which connects the first mounting portion and the second mounting portion.

The first mounting portion and the second mounting portion, which are connected by the bridge, may be provided such that torque caused by screw engagement of the second mounting portion is not transmitted to the first mounting portion by the bridge, thereby preventing a gap from being enlarged at a portion where the SUS trim of the vehicle body and the end piece are coupled to each other.

That is, by preventing a gap between the SUS trim and the end piece from being enlarged, quality in external appearance of the vehicle may be improved such that an initial quality index and a durability quality index may be increased, and corrosion of a gap portion due to rain water may be prevented.

In addition, the bridge may be configured as an elastically deformable elastic body so as to absorb torque caused by screw engagement of the second mounting portion such that when torque occurs, only the bridge is elastically deformed and torque is not transmitted to the first mounting portion.

Moreover, instead of the two-piece type structure of the exterior door strip of the related art in which the mounting portion is configured by two pieces, a one-piece type structure may be applied, thereby reducing working time and the number of workers required for assembling a vehicle body, and production costs of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1A:
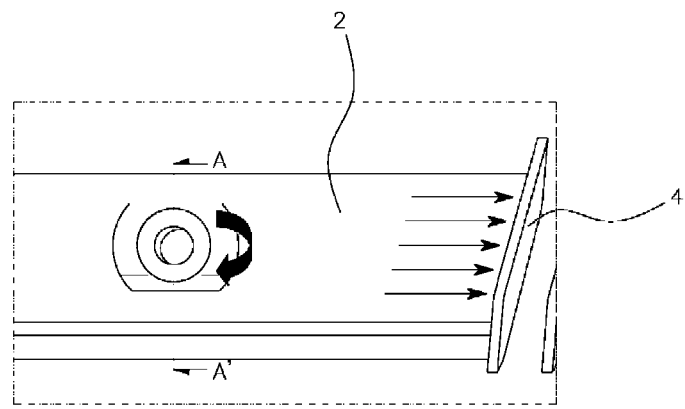
FIG. 1A is a front view illustrating aspects of a common mounting portion and an end piece of a structure of an exterior door strip of the related art (prior art).
Figure 1B:
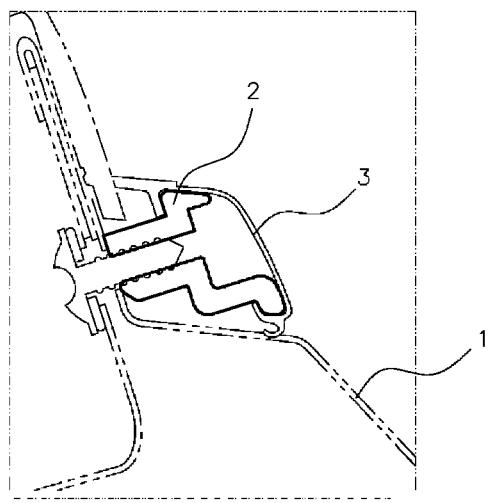
FIG. 1B is a cross-sectional view taken along line A-A' of FIG. 1A.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A structure of an exterior door strip according to the present invention includes a mounting portion mounted by a screw to an outer side of a outer door panel 10 positioned at a side of a vehicle, and an steel use stainless portion 20 coupled to an outer side of the mounting portion. The structure of the exterior door strip includes a first mounting portion 30 formed in a longitudinal direction and having one end to which an end piece 32 is coupled, a bridge 50 having one end connected to the other end of the first mounting portion 30, and a second mounting portion 40 connected to the other end of the bridge 50 and having a screw hole 42 formed so that a screw may be coupled to the second mounting portion 40. The first mounting portion 30, the bridge 50, and the second mounting portion 40 are integrally formed, and torque caused by screw engagement of the second mounting portion 40 is not transmitted to the first mounting portion 30 by the bridge 50. One will appreciate that such integral components may be monolithically formed.

Figure 2:
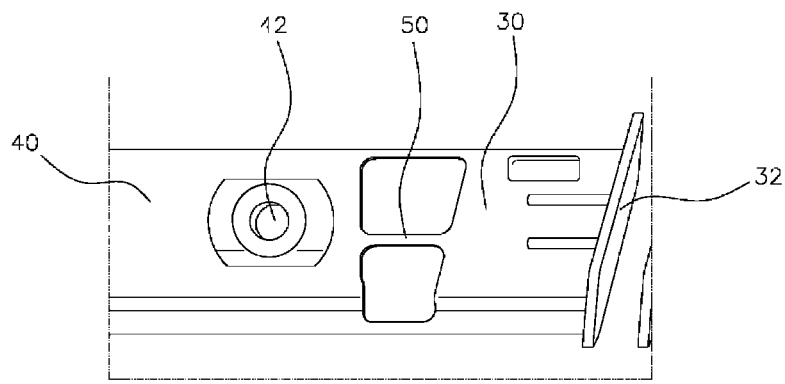
FIG. 2 is a schematic view illustrating an exemplary exterior door strip according to the present invention is mounted to a vehicle.
Figure 3:
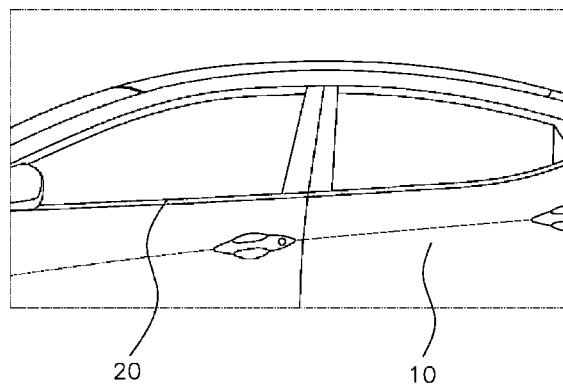
FIG. 3 is a front view illustrating an aspect of an exemplary exterior door strip according to the present invention.

As illustrated in FIG. 2, a stainless steel (SUS) trim 20 is fitted into and mounted to the outer side of the mounting portion that is mounted to the outer side of the outer door panel 10 positioned at the side of the vehicle. One will appreciate that the trim may be made of other suitable materials.

As illustrated in FIG. 2, the end piece 32 is coupled to the one end of the first mounting portion 30 so as to close an end of the exterior door strip, and although only one end of the exterior door strip is illustrated in FIG. 2, the first mounting portion 30 having one end to which the end piece 32 is coupled is also similarly connected to the opposite end of the exterior door strip.

In addition, the screw hole 42 is formed in the second mounting portion 40, which is connected to the first mounting portion 30 by the bridge 50, so that the second mounting portion 40 may be mounted to the outer door panel 10 of the vehicle by a screw, and torque is generated at the second mounting portion 40 when the outer door panel 10 and the second mounting portion 40 are engaged by the screw.

As illustrated in FIG. 2, the first mounting portion 30 and the second mounting portion 40 are connected by the bridge 50, and the bridge 50 may be formed to have a width relatively narrower than those of the first mounting portion 30 and the second mounting portion 40 so that torque generated at the second mounting portion 40 is not transmitted to the first mounting portion 30 but is absorbed by the bridge 50.

That is, the first mounting portion 30 and the second mounting portion 40 are formed to have a predetermined width similar to a width of a mounting portion of the related art, and the bridge 50 is formed to have a structure like a narrow bridge, which connects the first mounting portion 30 and the second mounting portion 40.

In addition, the first mounting portion 30, the bridge 50, and the second mounting portion 40 may be integrally formed so as to reduce working time and the number of workers required for assembling a vehicle body, and production costs of the vehicle, in comparison with a structure of an exterior door strip of the related art, which has two pieces of mounting portions. One will appreciate that such integral components may be monolithically formed.

Moreover, in various embodiments of the present invention, the bridge 50 may be formed as an elastically deformable elastic body such as a rubber, a spring, or a thin iron plate so as to completely absorb torque caused by screw engagement of the second mounting portion 40.

That is, since the bridge 50 is configured as the elastically deformable elastic body, the bridge 50 completely absorbs torque generated at the second mounting portion 40, so that even though the second mounting portion 40 and the bridge 50 are deformed, the deformation may be prevented from being transmitted to the end piece 32.

As illustrated in FIG. 2, the bridge 50 is disposed in a straight line in a longitudinal direction with the screw hole 42 in the second mounting portion 40, and structurally prevents torque generated in the screw hole 42 from being transmitted to the first mounting portion 30 on the basis of the bridge 50.

That is, the bridge 50 is disposed at a position to which the smallest amount of torque generated in the screw hole 42 is applied, such that a minimum amount of torque generated at the second mounting portion 40 is transmitted to the first mounting portion 30.

Figure 4:
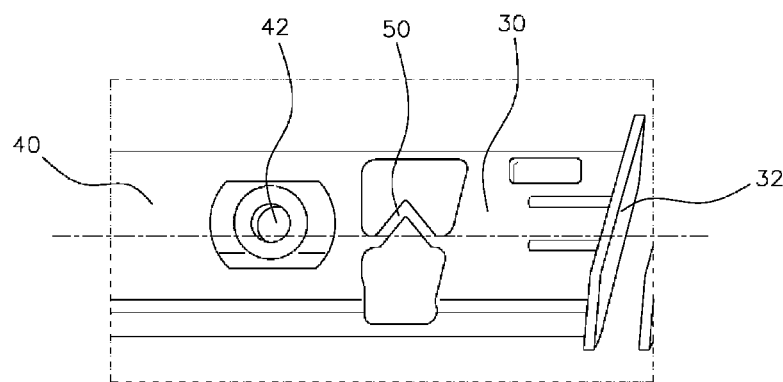
FIG. 4 is a front view illustrating an aspect of an exemplary exterior door strip according to the present invention.
Figure 5:
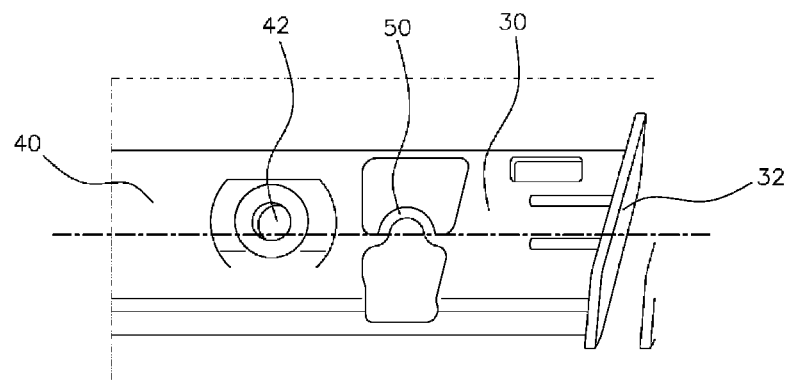
FIG. 5 is a front view illustrating an aspect of an exemplary exterior door strip according to the present invention.

As illustrated in FIGS. 4 and 5, the bridge 50 may be formed such that a center portion is curved toward an upper side or a lower side of the vehicle body on the basis of a center axis of the mounting portion so as to disperse torque generated at the second mounting portion 40.

Although the bridge 50 is curved toward an upper side of the vehicle body so as to have a V-shape and a U-shape, one will appreciate that the bridge 50 may have various shapes in accordance with a type of vehicle, a shape of a vehicle body, a shape of a mounting portion, an amount of generated torque, and the like, and the bridge 50 may be formed to be curved downward on the basis of the center axis.

Figure 6:
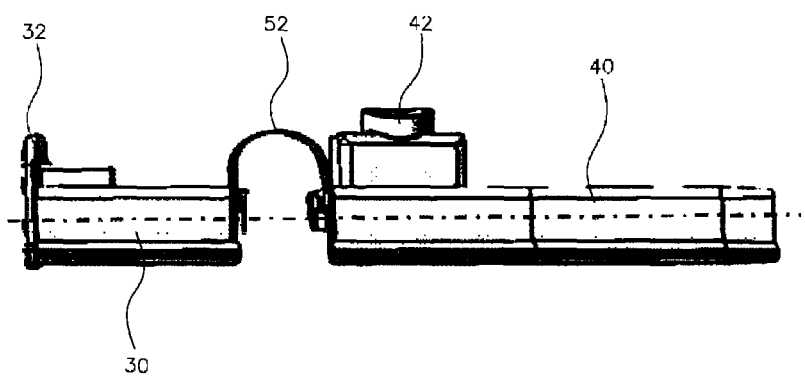
FIG. 6 is a side view illustrating an aspect of an exemplary exterior door strip according to the present invention.

In addition, as illustrated in FIG. 6, the bridge 50 is formed as U-shaped wiring 52 which connects the first mounting portion 30 and the second mounting portion 40 so as to form a predetermined space between the first mounting portion 30 and the second mounting portion 40, and prevent a gap between the end piece 32 and the SUS trim 20 from being enlarged, using elastic force of the wiring 52.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exterior door strip assembly comprising:
   a mounting portion configured to be attached to an outer surface of an outer body panel of a vehicle, the mounting portion including an outer side configured to support a trim piece, the mounting portion further comprising:
   a first mounting portion extending in a longitudinal direction and having one end to which an end piece is coupled;
   a second mounting portion having a screw hole formed therein for receiving a screw for coupling the second mounting portion to the outer surface of the outer body panel; and
   a bridge extending between and interconnecting the first and second mounting portions;
   wherein the first mounting portion, the bridge, and the second mounting portion are monolithically formed;
   wherein torque caused by screw engagement with the second mounting portion is not transmitted by the bridge to the first mounting portion, and
   wherein the bridge extends in a straight line aligned with the screw hole in a longitudinal direction of a vehicle body.

2. The exterior door strip assembly of claim 1, wherein the bridge is an elastically deformable elastic body to absorb torque caused by the screw engagement of the second mounting portion.

3. The exterior door strip assembly of claim 1, wherein the bridge has a center portion which is curved toward an upper side or a lower side of the vehicle body.

4. The exterior door strip assembly of claim 1, wherein the bridge is a U-shaped wiring which interconnects the first mounting portion and the second mounting portion.

5. The exterior door strip assembly of claim 1, wherein the trim piece is a metallic trim.

\* \* \* \* \*